US006856257B1

(12) United States Patent
Van Heteren

(10) Patent No.: US 6,856,257 B1
(45) Date of Patent: Feb. 15, 2005

(54) DATA COLLECTION AND METERING SYSTEM

(75) Inventor: John Gerald Van Heteren, Foster City, CA (US)

(73) Assignee: Gellnet Innovations, Inc., Alpharetta, GA (US)

( * ) Notice: Subject to any disclaimer, the term of this patent is extended or adjusted under 35 U.S.C. 154(b) by 483 days.

(21) Appl. No.: 10/122,471

(22) Filed: Apr. 12, 2002

(51) Int. Cl.[7] .............................................. G08C 19/20
(52) U.S. Cl. ......................... 340/870.03; 340/870.02; 340/870.11; 340/10.1; 340/870.41
(58) Field of Search ...................... 340/870.02, 870.03, 340/870.11, 10.1, 870.41

(56) References Cited

U.S. PATENT DOCUMENTS

| | | | |
|---|---|---|---|
| 4,517,669 | A | 5/1985 | Freeburg et al. |
| 4,589,075 | A | 5/1986 | Buennagel |
| 4,597,105 | A | 6/1986 | Freeburg |
| 4,614,945 | A | 9/1986 | Brunius et al. |
| 4,698,628 | A | 10/1987 | Herkert |
| 4,749,992 | A | 6/1988 | Fitzemeyer et al. |
| 4,799,059 | A | 1/1989 | Grindahl et al. |
| 4,804,957 | A | 2/1989 | Selph et al. |
| 5,038,140 | A | 8/1991 | Ikeuchi |
| 5,056,107 | A | 10/1991 | Johnson et al. |
| 5,079,715 | A | 1/1992 | Venkataraman et al. |
| 5,381,462 | A | 1/1995 | Larson et al. |
| 5,438,329 | A * | 8/1995 | Gastouniotis et al. .. 340/870.02 |
| 5,448,230 | A * | 9/1995 | Schanker et al. ...... 340/870.03 |
| 5,475,867 | A | 12/1995 | Blum |
| 5,506,404 | A | 4/1996 | Milan-Kamski |
| 5,553,094 | A | 9/1996 | Johnson et al. |
| 5,590,179 | A | 12/1996 | Shincovich et al. |
| 5,673,252 | A | 9/1997 | Johnson et al. |
| 5,696,501 | A | 12/1997 | Ouellette et al. |
| 5,717,718 | A * | 2/1998 | Rowsell et al. ............. 375/260 |
| 5,719,564 | A * | 2/1998 | Sears ..................... 340/870.02 |
| 5,918,380 | A | 7/1999 | Schleich et al. |
| 5,933,092 | A | 8/1999 | Ouellette et al. |
| 6,006,212 | A | 12/1999 | Schleich et al. |
| 6,195,018 | B1 | 2/2001 | Ragle et al. |
| 6,242,677 | B1 * | 6/2001 | Sander ........................ 84/322 |
| 6,333,975 | B1 | 12/2001 | Brunn et al. |
| 6,351,223 | B1 * | 2/2002 | DeWeerd et al. ...... 340/870.03 |
| 6,492,910 | B1 | 12/2002 | Ragle et al. |
| 6,778,099 | B1 * | 8/2004 | Meyer et al. .......... 340/870.02 |

FOREIGN PATENT DOCUMENTS

EP           0629098       *   5/1994

OTHER PUBLICATIONS

DataBeam *AMR System Description* Jul., 1986.
Domestic Automation Company, "SuperMeter II family of intelligent registers" SM–3300, Product Profile, San Carlos, Califonia.
Domestic Automation Company, "LINC Data Acquisition System", Product Profile, San Carlos, California.

(List continued on next page.)

Primary Examiner—Albert K. Wong
(74) Attorney, Agent, or Firm—Kilpatrick Stockton LLP

(57) ABSTRACT

Methods and apparatus implementing and using techniques for data collection, including using a plurality of telemetry devices to generate and transmit a series of measurements and transmit the measurements. Each of a plurality of collection devices are used to receive measurements from one or more telemetry devices, transmit data based on the measurements received from a telemetry device in a first set of telemetry devices to a monitoring station and, upon request from the monitoring station, transmit data based on measurements received from a telemetry device in a second set of telemetry devices to the monitoring station. A monitoring station is used to designate a collection device as a preferred collection device for a telemetry device and designate at least one other collection device as an alternate collection device for the telemetry device.

30 Claims, 8 Drawing Sheets

OTHER PUBLICATIONS

Domestic Automation Company, "SM–101", Product Profile, San Carlos, California.

Domestic Automation Company, "SM–301", Product Profile, San Carlos, California.

Domestic Automation Company, "DAC Probe" Product Profile, San Carlos, California.

Domestic Automation Company, "Super Meter" Product Profile, San Carlos, California.

Larry Waters, General Electric Company, "Future Trends in Metering" Southeastern Meterman's Association Conference on Meters, Tampa, Florida, Oct., 1991.

GE Meter and Control, "GE UCNet System", publication, Somersworth, NH, Sep., 1991.

Ed White, "Development of the MV–90 Multi–Vendor Translation System", Raleigh, North Carolina, 1990.

GE Electronic Metering, "TMR–900", Product Profile, Somersworth, NH, Jan. 1990.

General Electric, "Engineering Presentation to AEIC/EEI Meter and Service Committees", Indianapolis, Indiana, Sep. 22, 1986.

General Electric, "Engineering Presentation to Pennsylvania Electric Association Meter Committee", Reading, Pennsylvania, Oct. 15–16, 1987.

General Electric, "Engineering Presentation to AIEC/EEI Meter and Service Committees", Columbus, Ohio, Apr. 27, 1987.

General Electric, "DR–87 Electronic Demand Recorder", Product Profile, Somersworth, NH.

* cited by examiner

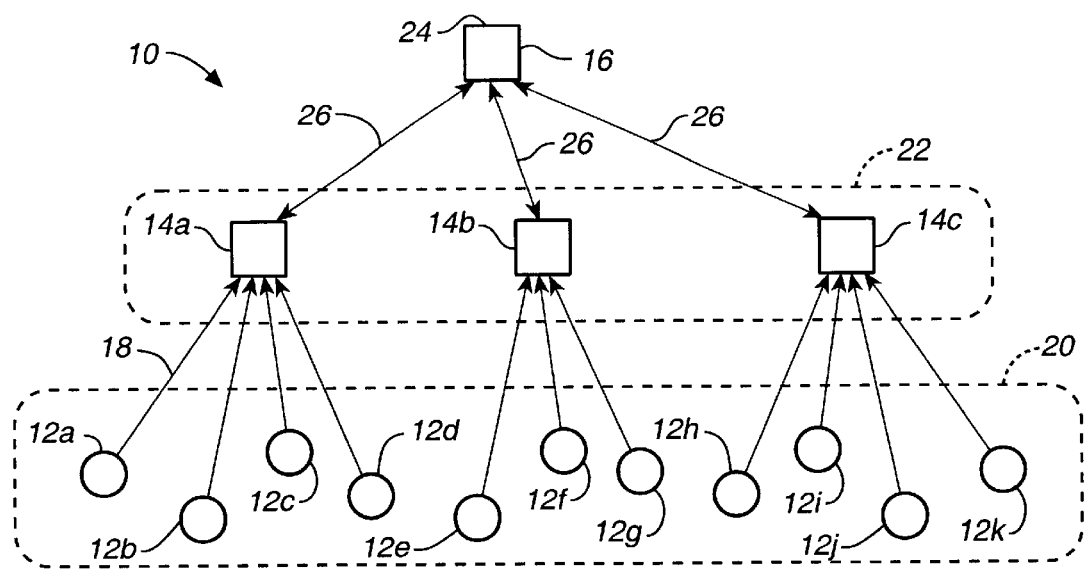
FIG._1A
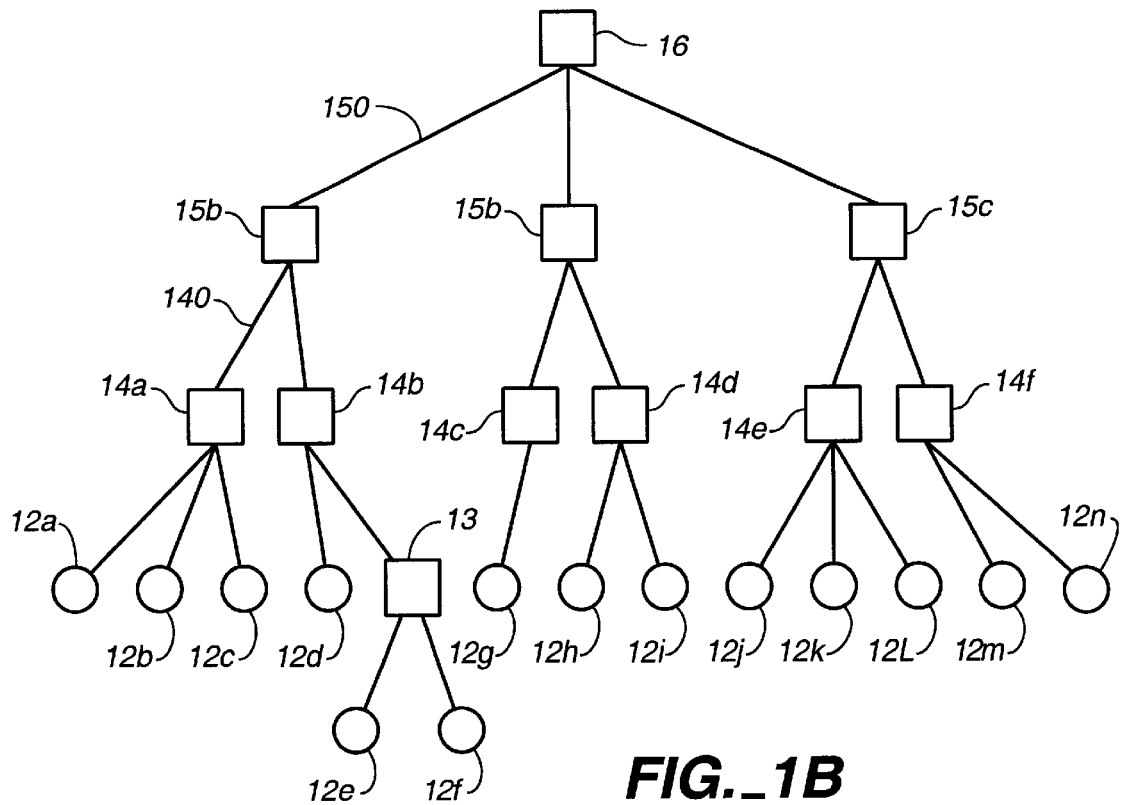
FIG._1B

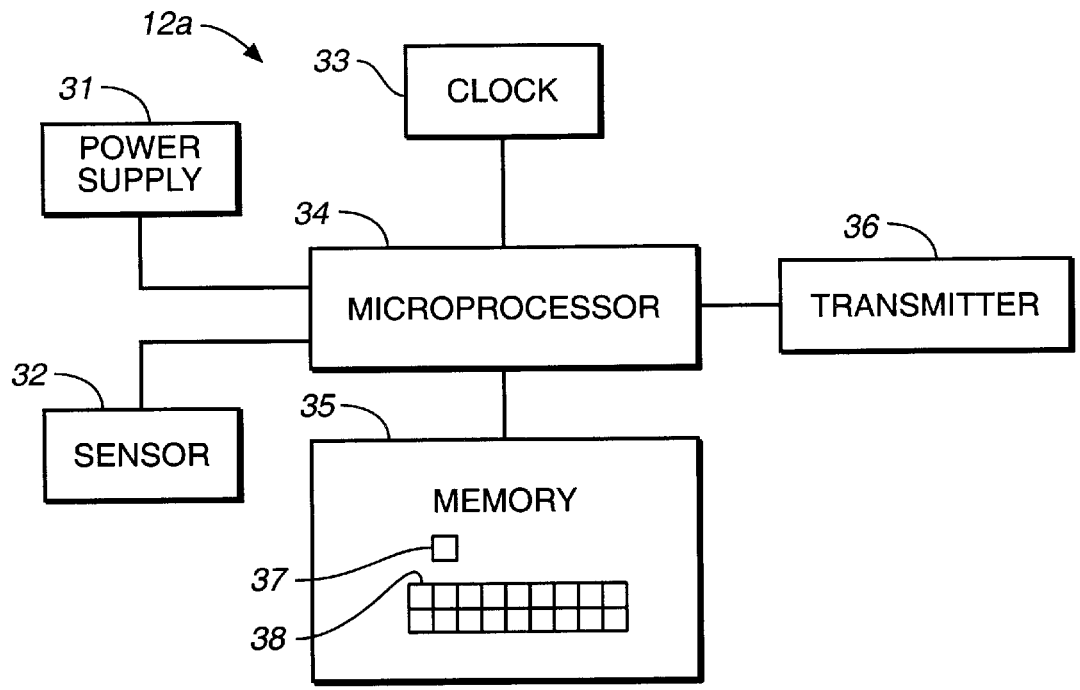
*FIG._2*
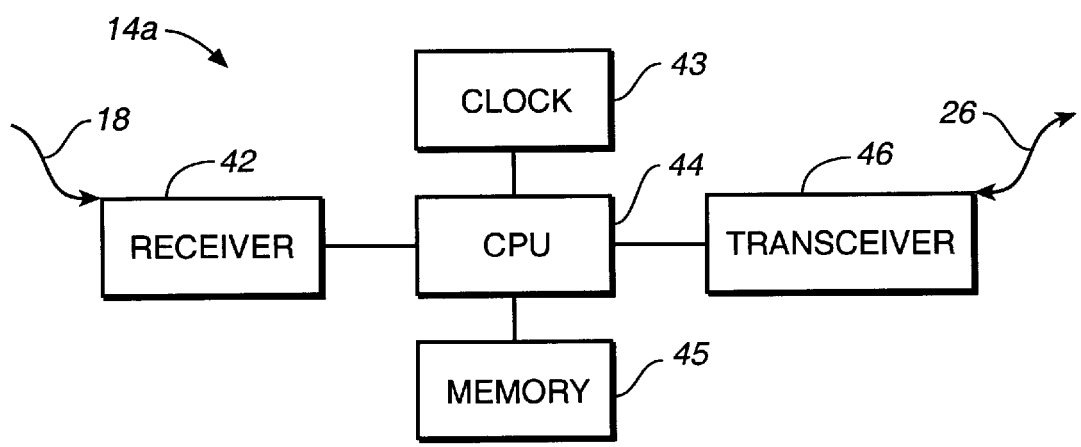
*FIG._3*

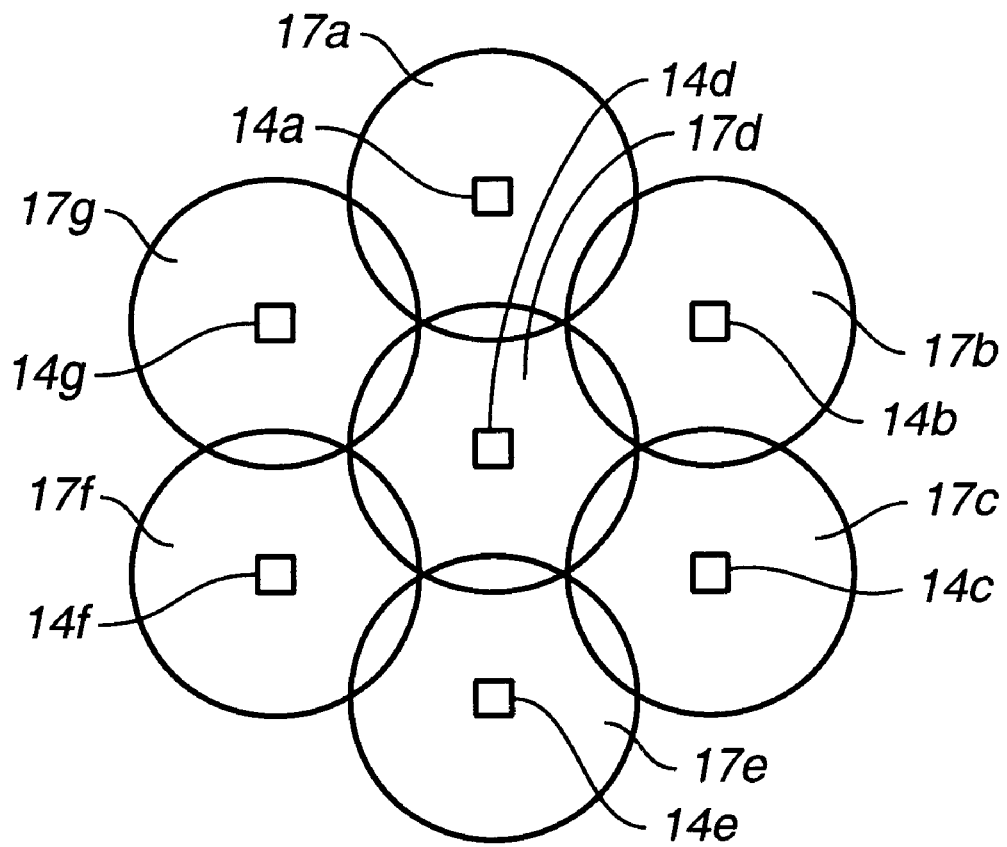
FIG._4

| Telemetry Device | Preferred Collector | Alternate #1 Collector | Alternate #2 Collector |
|---|---|---|---|
| 12a | 14a | 14b | 14c |
| 12b | 14a | 14b | 14c |
| 12c | 14a | 14c | 14b |
| 12d | 14a | 14c | 14b |
| 12e | 14b | 14a | 14c |
| 12f | 14b | 14c | 14a |
| 12g | 14b | 14a | 14c |
| 12h | 14c | 14a | 14b |
| 12i | 14c | 14b | 14a |
| 12j | 14c | 14a | 14b |
| 12k | 14c | 14b | 14a |

FIG._5

| Collector | First Set of Telemetry Devices | Second Set of Telemetry Devices |
|---|---|---|
| 14a | 12a, 12b, 12c, 12d | 12e, 12f, 12g, 12h, 12i, 12j, 12k |
| 14b | 12e, 12f, 12g | 12a, 12b, 12c, 12d, 12h, 12i, 12j, 12k |
| 14c | 12h, 12i, 12j, 12k | 12a, 12b, 12c, 12d, 12e, 12f, 12g |

FIG._6

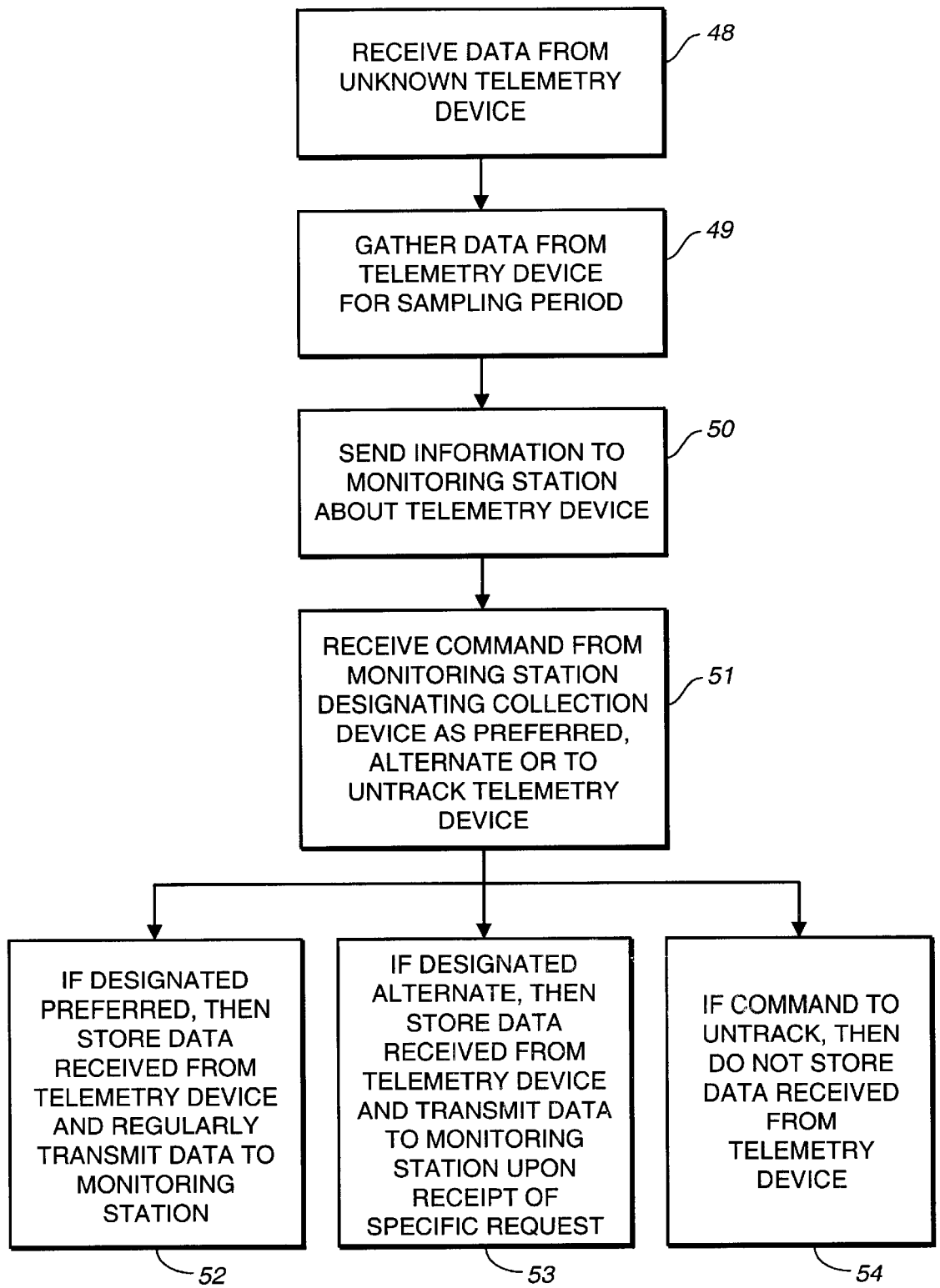
FIG._7

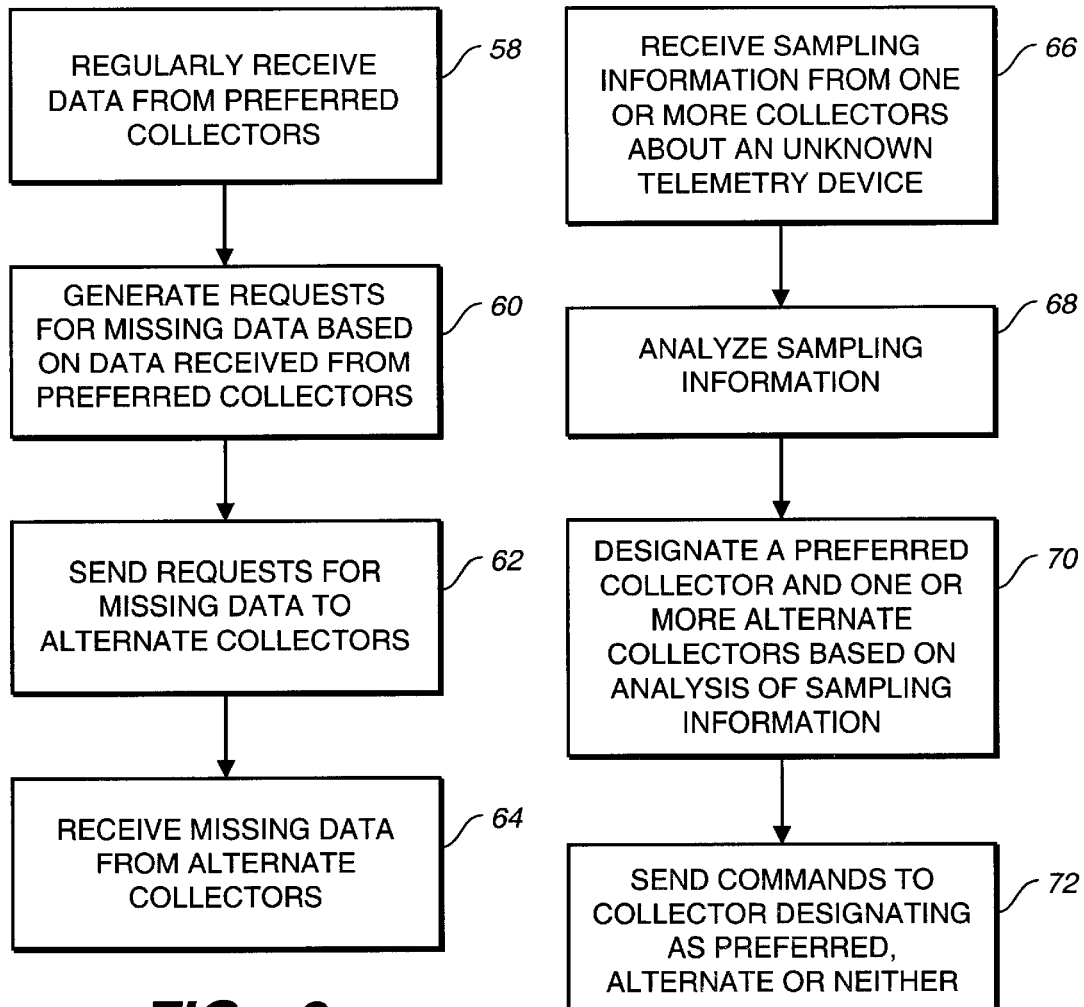
FIG._ 8
FIG._ 9

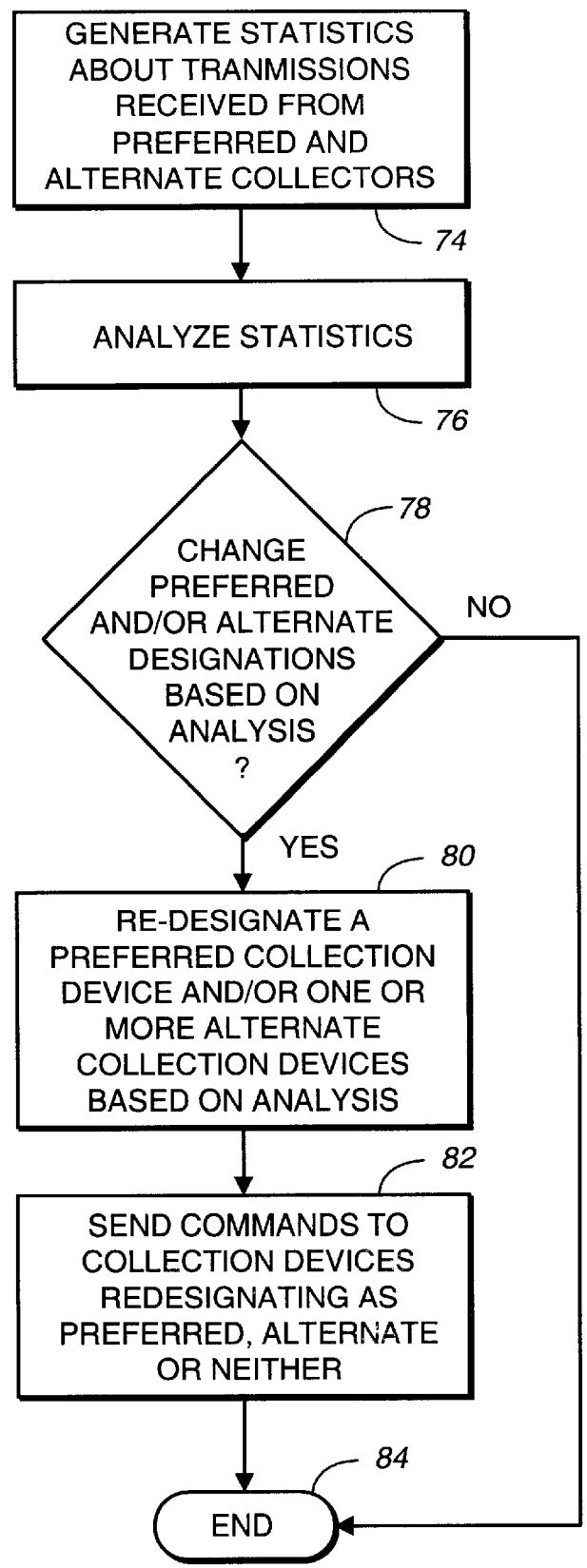
FIG._10

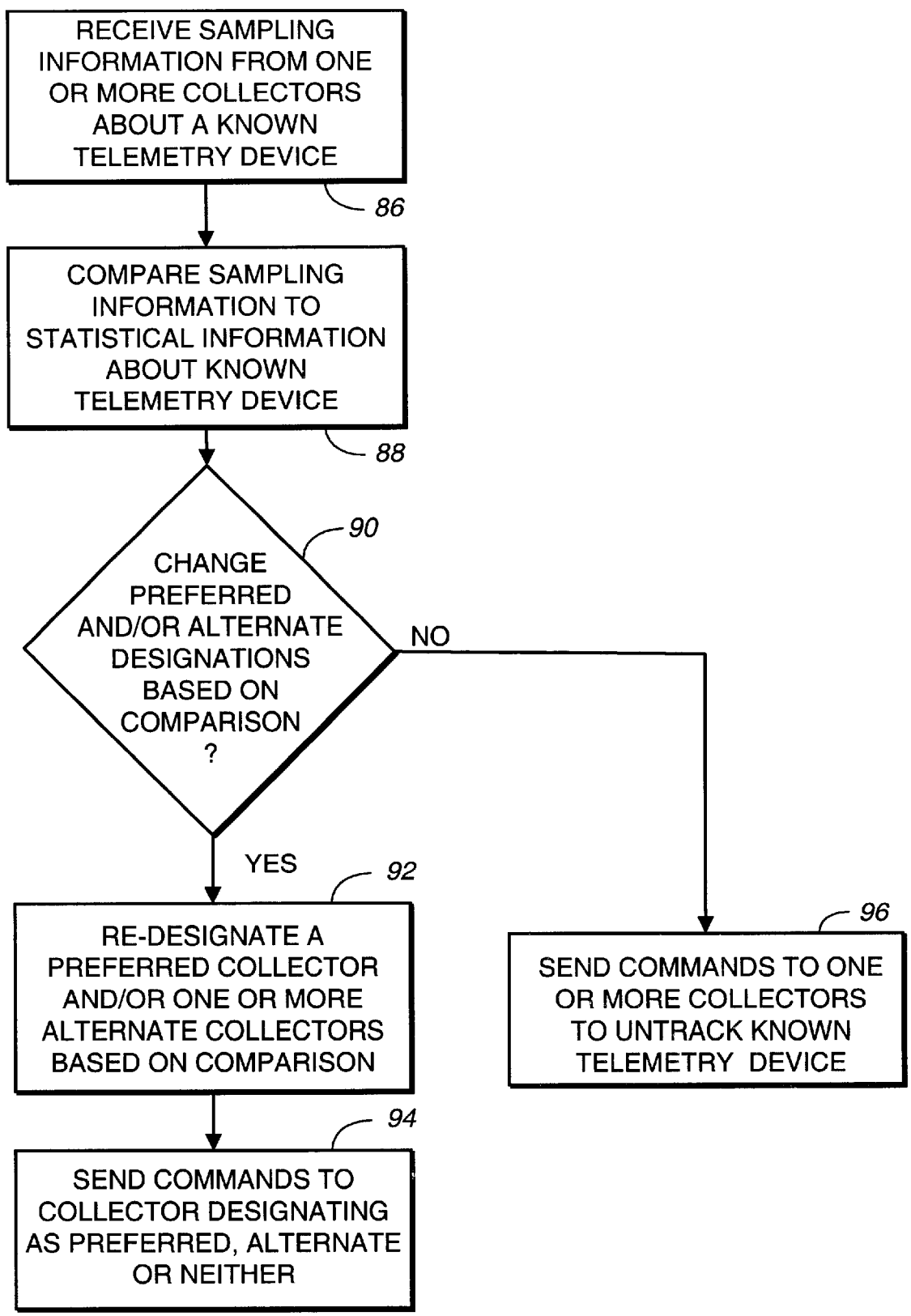
FIG._11

DATA COLLECTION AND METERING SYSTEM

TECHNICAL FIELD

This invention relates to data collection and metering systems.

BACKGROUND

Metering is the periodic measurement of a parameter at multiple locations. For example, utility companies meter the natural gas, electricity and water consumed by households.

The collection of data from a metering system can be performed by physical inspection of individual meters. For example, in residential areas, electrical utility companies use electromechanical meters with rotating disks to measure the consumption of electricity. Electrical utility companies send a "meter reader" to record the meter measurement about once a month. Metering of natural gas and water is handled similarly.

Alternatively, a metering system can have multiple telemetry devices for transmitting meter data from multiple locations to multiple collection devices, there being fewer collection devices than telemetry devices. Transmissions from an individual telemetry device to a collection device can be used to collect meter data, rather than a physical inspection of the individual telemetry device. The multiple collection devices can transmit data based on the transmissions received from multiple telemetry devices to a central monitoring station. The collection devices can be positioned such that transmissions from a single telemetry device can be received by more than one collection device.

SUMMARY

The present invention provides methods and apparatus for data collection. In general, in one aspect, the invention features a data collection system including a plurality of telemetry devices, a plurality of collection devices and a monitoring station.

Each telemetry device is configured to generate a series of measurements and transmit the measurements. Each collection device is configured to receive measurements from one or more telemetry devices, transmit data based on the measurements received from a telemetry device in a first set of telemetry devices to a monitoring station and, upon request from the monitoring station, transmit data based on measurements received from a telemetry device in a second set of telemetry devices to the monitoring station. The monitoring station is configured to designate a collection device as a preferred collection device for a telemetry device and designate at least one other collection device as an alternate collection device for the telemetry device. The monitoring station is further configured to receive data from the preferred collection device for the telemetry device and, based on the data received from the preferred collection device for the telemetry device, send a request to at least one alternate collection device for the telemetry device for missing data for the telemetry device.

Implementations of the invention may include one or more of the following. The collection devices can transmit data directly to the monitoring station, or can transmit data indirectly to the monitoring station via one or more intermediate devices. Transmissions from the plurality of telemetry devices can be received directly by one or more collection devices, or can be received by one or more collection devices indirectly from one or more repeater devices.

The monitoring station can be configured to designate a preferred collection device and an alternate collection device for each telemetry device having transmissions received by more than one collection device. The collection devices can be further configured to generate sampling information in reference to a telemetry device and to transmit the sampling information to the monitoring station. Based the sampling information received from one or more collection devices, the monitoring station can be configured to designate a collection device as a preferred collection device and at least one collection device as an alternate collection device for the telemetry device. The sampling information can be based on data received from a telemetry device over a predefined sampling period, and can include, for example, a transmission success rate, a determined signal strength or a signal to noise ratio. The sampling period may be approximately four to twenty-four hours. The parameter that is measured can be selected from the group consisting of electrical power, fluid flow, voltage, current, temperature, pressure and humidity.

The monitoring station can be further configured to send a first request to a first alternate collection device for missing data for a telemetry device and, based on a response to the request, send a second request to a second alternate collection device for the missing data.

Each of the plurality of telemetry devices can include a sensor, a memory and a transmitter. The sensor is configured to generate a series of successive measurements by measuring the parameter at a series of measurement times. The memory is configured to store a plurality of measurements from said series of successive measurements. The transmitter is configured to transmit measurements stored in memory at a series of transmission times, each of said transmitted measurements being transmitted at a plurality of different transmission times. The transmitter can be further configured to generate wireless transmissions.

In general, in another aspect, the invention features a data collection system including a plurality of telemetry devices, a plurality of collection devices and a monitoring station. Each telemetry is configured generate and transmit a series of measurements. Each collection device is configured to receive measurements from one or more telemetry devices, transmit data based on the measurements received from a telemetry device in a first set of telemetry devices to a monitoring station and, upon request from the monitoring station, transmit data based on measurements received from a telemetry device in a second set of telemetry devices to the monitoring station.

The monitoring station is configured to designate a collection device as a preferred collection device for a telemetry device and designate at least one other collection device as an alternate collection device for the telemetry device, receive data from the preferred collection device for the telemetry device and, based on the data received from the preferred collection device for the telemetry device, send a request to at least one alternate collection device for the telemetry device for missing data for the telemetry device. The monitoring station is further configured to generate statistics in reference to a telemetry device based on data received from the preferred collection device and the at least one alternate collection device designated for the telemetry device, and determine whether to re-designate one or more of the preferred collection device and the at least one alternate collection device for the telemetry device based on the statistics.

Implementations of the invention can include one or more of the following. The statistics can include a data collection success rate for each of the preferred collection device and the at least one alternate collection device. The monitoring station can be configured to generate the statistics periodically.

In general, in another aspect, the invention features a data collection system, also including a plurality of telemetry devices, each configured to generate and transmit a series of measurements, a plurality of collection devices, and a monitoring station. Each collection device is configured to receive measurements from one or more telemetry devices, transmit data based on the measurements received from a telemetry device in a first set of telemetry devices to a monitoring station; and upon request from the monitoring station, transmit data based on measurements received from a telemetry device in a second set of telemetry devices to the monitoring station.

The monitoring station is configured to designate a collection device as a preferred collection device for a telemetry device and designate at least one other collection device as an alternate collection device for the telemetry device, receive data from the preferred collection device for the telemetry device and, based on the data received from the preferred collection device for the telemetry device, send a request to at least one alternate collection device for the telemetry device for missing data for the telemetry device. The monitoring station is further configured to receive sampling information from one or more collection devices for a known telemetry device having a designated preferred collection device and at least one alternate collection device, wherein the one or more collection devices are not the designated preferred or alternate collection devices. The monitoring station generates statistics for the known telemetry device based on data received from the preferred collection device and the at least one alternate collection device, and determine whether to re-designate the preferred collection device and the at least one alternate collection device for the known telemetry device based on the statistics and the sampling information.

Implementations of the invention can include one or more of the following. The sampling information can include a transmission success rate for the one or more collection devices. The statistics can include a data collection success rate for each of the preferred collection device and the at least one alternate collection device. The transmission success rate included in the sampling information can be converted into an anticipated data collection rate for the one or more collection devices. The monitoring station can be configured to determine whether to re-designate the preferred collection device and the at least one alternate collection device for the known telemetry device by comparing the anticipated data collection rate for the one or more collection devices, and the transmission success rates for the preferred collection device and at least one alternate collection devices.

In general, in another aspect, the invention features a data collection system including a plurality of telemetry devices, a plurality of collection devices and a monitoring station. Each telemetry device is configured to generate and transmit a series of measurements. Each collection device is configured to receive measurements from one or more telemetry devices, transmit data based on the measurements received from a telemetry device in a first set of telemetry devices to a monitoring station, and upon request from the monitoring station, transmit data based on measurements received from a telemetry device in a second set of telemetry devices to the monitoring station. Each of the collection devices includes a receiver, a processor and a transceiver. The receiver is configured to receive transmissions from one or more telemetry devices, the transmissions including a series of successive measurements. The processor is configured to extract the series of successive measurements from a series of received transmissions and further configured to generate processed data for the parameter by analyzing the series of successive measurements. The transceiver is configured to transmit data comprising the processed data to a monitoring station and to receive a transmission from a monitoring station. The transmitter of each collection device can be configured to generate wireless transmissions.

The monitoring station is configured to designate a collection device as a preferred collection device for a telemetry device and designate at least one other collection device as an alternate collection device for the telemetry device. The monitoring station receives data from the preferred collection device for the telemetry device and, based on the data received from the preferred collection device for the telemetry device, sends a request to at least one alternate collection device for the telemetry device for missing data for the telemetry device.

In general, in another aspect, the invention features a monitoring station including at least one receiver for receiving transmissions from a plurality of collection devices, the transmissions including sampling data and processed metered function data in reference to a plurality of telemetry devices, at least one processor and at least one transmitter. The at least one processor is programmed to analyze sampling data in reference to a telemetry device to designate a collection device as a preferred collection device for the telemetry device, and to designate at least one other collection device as an alternate collection device for the telemetry device. The processor is further programmed to generate a request for missing data in reference to a telemetry device, based on metered function data received from the preferred collection device for the telemetry device. The at least one transmitter transmits a request for missing data to the at least one alternate collection device.

Implementations of the invention can include one or more of the following. The processor can be further programmed to generate statistical information for a telemetry device based on the metered function data received in reference to the telemetry device from the designated preferred and at least one alternate collection device, and to determine whether to re-designate a preferred collection device and the at least one alternate collection device based on the statistical information. The monitoring station can include a plurality of receivers, a plurality of processors and a plurality of transmitters.

In general, in another aspect, the invention features a method of collecting data. The method includes the step of generating a series of measurements at a plurality of telemetry devices by measuring a parameter and transmitting the measurements. The method further includes the step of collecting the measurements at a plurality of collection devices and processing the measurements at the collection devices to generate metered function information of the parameter. A collection device is designated as a preferred collection device and at least one other collection device is designated as an alternate collection device for each of the plurality of telemetry devices. Metered function information is received from the preferred collection devices at a monitoring station. A request for any missing data based on the metered function information received from the preferred collection devices is generated and transmitted to at least one alternate collection device.

Implementations of the invention can include one or more of the following. Sampling information in reference to a telemetry device can be transmitted from one or more collection devices to the monitoring station. The sampling information can be used to designate a preferred collection device and at least one alternate collection device for a telemetry device. Statistical information can be generated in reference to a telemetry device based on the data received from a designated preferred collection device and at least one designated alternate collection device for the telemetry device. A determination can be made to re-designate one or more of the preferred collection device and the at least one alternate collection device for the telemetry device based on the statistical information.

Sampling information in reference to a telemetry device having a designated preferred and at least one alternate collection device can be transmitted from one or more collection devices to the monitoring station, wherein the one or more collection devices are not the designated preferred or alternate collection devices. Statistical information can be generated in reference to the telemetry device, based on the data received from the preferred collection device and the at least one designated alternate collection device for the telemetry device. A determination can be made whether to re-designate the preferred collection device and the at least one alternate collection device for the telemetry device based on the sampling information and the statistical information.

Embodiments may have one or more of the following advantages. Designating a single collector, the preferred collector, to regularly transmit processed data to a monitoring station for a given telemetry device prevents redundant processing and transmitting of data by one or more other collectors. Having at least one collector designated an alternate collector improves the success rate of data collection by a monitoring station, while minimizing transmissions between the collectors and monitoring station.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1A is a schematic representation of a metering system.

FIG. 1B is a schematic representation of an alternate configuration of the metering system of FIG. 1A.

FIG. 2 is a block diagram of a telemetry device of the metering system of FIG. 1A or 1B.

FIG. 3 is a block diagram of a collector of FIG. 1A or 1B.

FIG. 4 is a schematic representation of the effective coverage range of a plurality of collectors.

FIG. 5 is a table indicating the preferred and alternate collectors for a set of telemetry devices.

FIG. 6 is a table indicating a set of telemetry devices for which a collector is the preferred collector and a set of telemetry devices for which a collector is an alternate collector.

FIG. 7 is a flowchart of a process for discovering an unknown telemetry device.

FIG. 8 is a flowchart of a process for retrieving missing data.

FIG. 9 is a flowchart of a process for designating preferred and alternate collectors.

FIG. 10 is a flowchart of a process for re-designating preferred and alternate collectors.

FIG. 11 is a flowchart of another process for re-designating preferred and alternate collectors.

Like reference symbols in the various drawings indicate like elements.

DETAILED DESCRIPTION

A metering or data collection system according to the present invention may be used in a variety of applications, such as utility metering, manufacturing control, traffic monitoring, and meteorological data gathering.

As shown in FIG. 1A, a metering system or network 10 may have at least three functional levels: a measurement level 20, a collection level 22, and a monitoring level 24. The measurement level 20 periodically measures a parameter at multiple locations. Possible parameters include, for example, electricity usage (kilowatt-hours), natural gas flow (cubic feet, cubic meters), water flow (cubic feet, cubic meters), temperature (degrees), pressure (Torr, KPa), humidity (partial pressure), wind speed (mph, kph), precipitation (inches, millimeters), voltage (volts) and current (amperes). The collection level 22 can process the periodic measurements and generate processed data about the parameter at each location. For example, the processed data could include the minimum, maximum or average value of the parameter over one or more time periods. The monitoring level 24 controls the collection level 22 and receives the processed data. The operator of metering system 10, for example a utility company, determines how the monitoring level 24 uses the processed data. An example of such a metering system is described in Ragle et al, U.S. Pat. No. 6,195,018, Feb. 27, 2001, "Metering System", assigned to the assignee of the herein application, the entire contents of which are incorporated in to this application by reference.

The measurement level 20 includes meters or telemetry devices 12a–12k to measure the parameter of interest and transmit the measurement to collection level 22. Although FIG. 1A shows only eleven telemetry devices, measurement level 20 can include thousands or even in excess of a million telemetry devices. The telemetry devices are located as required for a particular application. For example, an electrical utility company could place one telemetry device at each house in a residential neighborhood to measure electrical energy consumption. As described below, each telemetry device can be constructed similarly.

The collection level 22 includes collection devices 14a–14c, simply referred to as collectors. The collectors are located to receive transmissions including meter data from the telemetry devices. Each collector processes the meter data received from one or more telemetry devices to generate processed data. The processed data is sent to the monitoring level 24 by transmissions 26. For example, an electrical utility company could configure the collectors to determine the electricity consumed each hour over the last twenty-four hours at each house in a residential neighborhood.

The monitoring level 24 includes a monitoring station 16. The monitoring station 16 includes one or more computers, to receive, store, and manipulate the processed data. The functions of the monitoring level 24 depend upon the intended application for metering system 10. For example, an electrical utility company could use the monitoring level 24 to generate a billing for each house in a residential neighborhood at the end of each month.

Each telemetry device 12a–12k in the metering level 20 periodically transmits its measurements by means of transmissions 18, which are received by the collection level 22.

These transmissions 18 may be wireless signals, such as radio frequency, microwave or infrared signals. Each collector receives transmissions from one or more telemetry devices. For example, collector 14a may receive transmissions from telemetry devices 12a–12d. A collector may receive transmissions from one to a thousand or more telemetry devices, although more likely two hundred to five hundred telemetry devices. Telemetry devices 12a–12k can be "transmit only" devices; i.e., the telemetry devices are not able to receive transmissions from collectors 14a–14c. Alternately, the telemetry devices can also be configured to receive transmissions. Each telemetry device 12a–12k can have only enough processing power to perform measurements and transmit the measurements to collection level 22.

Although FIG. 1A shows only three collectors, the collection level 22 could include hundreds or thousands of collectors, depending upon the number of telemetry devices in the metering level 20. Collectors 14a–14c communicate with the monitoring station 16 by two-way wired or wireless transmissions 26. Preferably, for wireless communication, some or all of the collectors are elevated, for example placed on a telephone pole, to facilitate the reception of transmissions from the telemetry devices 12a–12k and the monitoring station 16.

Referring to FIG. 1B, in one implementation, an intermediary device 13 between a telemetry device and a collector can be used, which intermediary device is referred to as a repeater. A repeater is capable of receiving transmissions from a telemetry device and retransmitting the transmissions. The repeater does not process the data included within the transmissions, but merely re-transmits, or "repeats", the transmissions. A repeater can be used to fill a gap between a telemetry device and a collector. For example, if some relatively small number of telemetry devices, such as 12e and 12f, were not within range of a collector, then rather than install an additional collector, a repeater 13 could be used to re-transmit transmissions received from the telemetry devices 12e, 12f such that the re-transmitted transmissions were in range of one or more collectors, such as collector 14b. Because a repeater has less capability than a collector, a repeater is typically less expensive, and accordingly can provide an economic and efficient solution in such situations.

An intermediate device 15a–c can be used between a collector 14a–f and a monitoring station 105, which intermediate device is referred to herein as a cellmaster. A cellmaster receives transmissions from one or more collectors, for example, cellmaster 15a receives transmissions from collectors 14a–b. The cellmaster 15a does not process the data included within the transmissions, but merely tunnels the information to the monitoring station 16. The collectors 14a–b can communicate with the cellmaster 15a by wired or wireless transmissions 140. Similarly, the collector 14a can communicate with the monitoring station 16 by wired or wireless transmissions 150. Transmissions originating at the monitoring station 16 and addressed to the collectors 14a–f are immediately passed transparently though the cellmasters 15a–c. Similarly, transmissions originating at the collectors 14a–f are passed transparently to the monitoring station 16. That is, the cellmasters 15a–c do not generate a polling signal to the collectors 14a–f for data retrieval, and do not store multiple collector transmissions before sending them on to the monitoring station 16.

Referring to FIG. 2, in one implementation, each telemetry device, e.g., telemetry device 12a, can include a microprocessor 34, a parameter sensor 32, a power supply 31, a clock 33, a memory 35, and a transmitter 36. The sensor 32 can be configured to generate a series of successive measurements by measuring a parameter at a series of measurement times. The memory 35 includes a pulse counter 37 and several registers 38. The counter 37 and the registers 38 store measurements from the sensor 32. The memory 35 can be constructed of non-volatile memory devices, such as erasable programmable read-only-memory chips (EPROMS), so that stored measurements are not lost if the power supply 31 fails. The transmitter 36 is preferably a spread spectrum transmitter and can be configured to transmit measurements stored in the memory to a collector at a series of transmission times, each of the transmitted measurements being transmitted at a plurality of different transmission times.

As shown in FIG. 3, in one implementation, a collector, such as collector 14a, includes a receiver 42, a central processing unit (CPU) 44, a clock 43, a memory 45, and a transceiver 46. The receiver 42 is configured to receive transmissions 18 from the telemetry devices 12a–12d, (FIGS. 1A and 1B) and deliver them to the CPU or processor 44. The transmissions 18 can include a series of successive measurements. Alternatively, the receiver 42 can be replaced by a transceiver capable of transmitting signals to a telemetry device or repeater. The processor 44 can be configured to extract the series of successive measurements from a series of received transmissions and further configured to generate processed data for the parameter by analyzing the series of successive measurements. The transceiver 46 is configured to send transmissions 26 including the processed data in reference to the telemetry devices 12a–12d to the monitoring station 16. The transceiver 46 can also receive transmissions 26 from the monitoring station 16 to configure the collector and determine which process the collector will use to process the data for each telemetry device 12a–12d, or a command as discussed below designating the collector 14a as a preferred or alternate collector for the telemetry device 12a. The memory 45 can be constructed of volatile or non-volatile memory devices, which then stores each transmission 18 in a memory 45.

The collector 14a can process the meter data contained in a transmission received from a telemetry device, such as telemetry device 12a, in several different ways, depending on the level of service that has been requested by the entity for who the parameter is being measured, for example, a utility company. The processing of the meter data by the collector 14a is conducted by meter agent processes, which are computer program modules operating within the collector 14a, defined for each specific endpoint telemetry device type. These processes receive transmissions from a telemetry device and decode them to extract the appropriate data. With the extracted data, the agent process computes an update to be saved in a local object database representation of each telemetry device assigned to the collector 14a. As each subsequent transmission is received, this object database representation of the telemetry device continues to be updated by the agent process.

Each agent process is defined by algorithms specific to the services provided for a telemetry device type. For example, utility telemetry devices are typically processed according to one of the following several possible service definitions, including basic meter reading, time-of-use service, demand service and load profile service.

In one implementation, the metering system 10 can be a metering system as described in Ragle et al, U.S. Pat. No. 6,195,018, Feb. 27, 2001, "Metering System", already incorporated herein by reference.

Transmissions from the telemetry devices 12a–12k are received by any collector located within receiving distance, which varies from time to time. Generally, the likelihood of a successful transmission from a telemetry device to a collector is correlated with the distance between that telemetry device and that collector. A standard can be adopted of ensuring that at least at certain percentage, for example, 96%, of the telemetry devices are within the effective coverage range of at least one collector. Referring to FIG. 4, this requires the collectors 14a–g be installed as shown, with the effective coverage areas 17a–g overlapping somewhat in order to ensure that nearly all telemetry devices are serviced. As a result, the telemetry devices toward the center of the collector coverage area are covered by more than one collector. In a typical system, 85% of the telemetry devices will be within the effective coverage range of more than one collector.

Referring to FIG. 1A, for example, telemetry device 12a can be positioned such that transmissions from telemetry device 12a are received by both collector 14a, as shown, and collector 14b. The monitoring station 16 designates one collector as the preferred collector for each telemetry device, and at least one other collector as an alternate collector for each telemetry device that is within the effective coverage range of more than one collector. The preferred collector transmits processed data in reference to a given telemetry device to the monitoring station 16 regularly, while an alternate collector transmits processed data to the monitoring station 16 for the telemetry device only upon specific request from the monitoring station 16.

For example, referring to FIG. 5, a table shows the designated preferred collector and two alternate collectors for each telemetry device 12a–12k. Conversely, as shown in FIG. 6, for each collector 14a–14c, there exists a first set of telemetry devices that includes those telemetry devices for which the collector is designated the preferred collector, and a second set of telemetry devices that includes those telemetry devices for which the collector is designated an alternate collector. Although each telemetry device 12a–12k is shown in FIG. 5 as having two alternate collectors, a telemetry device can have a single alternate collector or multiple alternate collectors, depending on the number of factors such as the number of collectors that receive transmissions from the telemetry device.

The preferred and alternate designations can be based on sampling information received from one or more collectors by the monitoring station during a discovery process, or based on statistical information generated by the monitoring station based on transmissions from a telemetry device. To understand how the monitoring station can determine the preferred and alternate designations, the discovery process must first be understood. Referring to FIG. 7, a collector performs a discovery or coordination process the first time the collector receives a transmission from a telemetry device.

Upon receiving a first transmission from the telemetry device (48), the collector begins to analyze the signals from the telemetry device for a pre-set sampling period, in order to generate sampling information to forward to the monitoring station 16 (49). By way of example (referring to FIG. 1A), consider a telemetry device 12a configured to measure electricity usage. The telemetry device 12a transmits measurements twelve times per hour by way of transmissions 18 including consumption packets, and transmits an administrative packet once per hour including information such as the type of parameter measured by the telemetry device (i.e. electricity), the frequency at which the telemetry device transmits meter data (i.e. 12 times per hour or once every 5 minutes) and the network address of the telemetry device 12a. The first transmission 18 received by the collector 14a initiates the discovery process. The collector 14a monitors the transmissions 18 received from the telemetry device 12a for a sampling period, expecting to receive a consumption packet every five minutes. For a telemetry device sending meter data every five minutes the sampling period can be set to approximately four hours. A four hour period should be long enough so that the sampling is not skewed by the vagaries of the local environment, but short enough so that the monitoring station can designate a preferred collector within a day of a new telemetry device entering a metering system. However, in another implementation where a telemetry device only send meter data every two hours, for example, a twenty-hour sampling period is more appropriate.

At the end of the sampling period, the collector 14a transmits sampling information to the monitoring station 16 based on an analysis of the transmissions 18 received from the telemetry device 12a (50). For example, the sampling information can include a "transmission success rate". The transmission success rate is calculated by first determining the number of consumption packets expected to be received by the collector 14a over a certain time period, for example, 48 packets over a 4 hour time period. The actual number of packets received from the telemetry device 12a over the time period is then divided into the total number expected, to arrive at a percentage of successful transmissions, known as the transmission success rate. For example, if only 29 of the expected 48 consumption packets were received by the collector 14a over the four hour sampling period, then the calculated transmission success rate would equal approximately 60%. The sampling information can also include other information, for example, a determined signal strength, a signal to noise ratio, or both.

Although the collector 14a will continue to receive transmissions from the telemetry device 12a, the collector 14a waits for a command from the monitoring station 16 either designating the collector 14a as the preferred collector, an alternate collector or neither, before processing and transmitting any additional data received from the telemetry device 12a to the monitoring station 16 (51).

Each time a new telemetry device is added to a metering system, a preferred and at least one alternate collector can be designated for the telemetry device by the monitoring station. Referring to FIG. 9, the first time a collector receives a transmission from a telemetry device, the collector starts the discovery process, described above, and transmits sampling information generated during a sampling period to the monitoring station. If a new telemetry device is added to a metering system, then at least one collector should receive a transmission from the telemetry device, triggering the discovery process. However, it is more likely that more than one collector will receive a transmission from the new telemetry device, and the monitoring station will receive sampling information from the more than one collector (66). The monitoring station can be configured such that if the monitoring station receives sampling information from one collector for a new telemetry device (i.e., a telemetry device not previously monitored by the monitoring station), then the monitoring station may wait for a pre-set period of time to see if other collectors transmit sampling information to the monitoring station for the new telemetry device, before the monitoring station designates a preferred and alternate collector for the new telemetry device.

The monitoring station analyzes the sampling information received from the one or more collectors to determine which collector should be designated the preferred collector, and which collector or collectors, if any, should be designated alternate collectors. For example, the monitoring station can compare the transmission success rates of the one or more collectors. Based on the analysis, the monitoring station designates a preferred collector and at least one alternate collector for the new telemetry device (70). In the event, the monitoring station received sampling information from only one collector, the one collector can automatically be designated the preferred collector without further analysis.

The monitoring station can designate more than one alternate collector. For example, the monitoring station can designate two alternate collectors for each telemetry device for which sampling information has been received from at least three collectors. The two alternate collectors can be designated as the #1 and #2 alternates, where the #1 alternate is preferred over the #2, meaning missing data is sought from the #1 before the #2 alternate is queried. The monitoring station can designate the #1 alternate over the #2 alternate using the same or a similar analysis as was described above to designate the preferred collector over an alternate collector.

The monitoring station sends commands to the one or more collectors to notify them of their designation as either the preferred or an alternate collector, or neither, in which case the collector is commanded to untrack the new telemetry device (72). If the collector 14a receives a command designating the collector as the preferred collector, then the collector stores and processes meter data received from the telemetry device and regularly transmits the processed data to the monitoring station (52). Transmissions from the collector 14a to the monitoring station 16 can be automatic or upon the collector 14a receiving a polling signal from the monitoring station 16. If the collector 14a receives a command designating the collector as an alternate collector, then the collector stores the meter data, but only transmits processed data based on the meter data to the monitoring station 16 upon receiving a specific request from the monitoring station (53). The collector 14a can either store the meter data and only process the meter data upon receipt of such a specific request, or the collector can process the meter data as it is received from the telemetry device 12a, but only transmit the processed data upon receipt of such a specific request. If the monitoring station 16 does not designate the collector 14a as either the preferred or an alternate collector for the telemetry device, then the monitoring station will command the collector to untrack the telemetry device. The collector may continue to receive transmissions from the telemetry device, but will neither store nor process the meter data (54).

The monitoring station can periodically re-designate the preferred and/or alternate collectors for a telemetry device. To understand the re-designation process, the analysis of data received for each telemetry device from one or more collectors must first be understood. Referring to FIG. 8, the monitoring station 16 regularly receives processed data (also referred to as metered function data or information) based on meter data generated by each telemetry device from the preferred collector for each telemetry device (58). For example, an electric utility may require processed data for each electric telemetry device once per day, and as such the monitoring station may receive an upload of processed data from the preferred collectors once per day at a specified time. The upload of processed data from a preferred collector as noted can be automatic or can be in response to a polling signal generated by the monitoring station and transmitted to the preferred collector.

Upon receipt of the processed data from the preferred collectors, the monitoring station analyzes the processed data to determine whether any data is missing. For example, in a typical implementation, the preferred collectors may provide only 96% of the data for a given time period, i.e. has a 96% "data collection rate". Missing data can arise due to a number of causes, including transmission failures due to environmental conditions, a failure of a telemetry device, or a temporary physical obstruction between a telemetry device and a collector blocking transmissions.

The transmission success rate discussed previously in reference to the discovery process is different from the data collection rate discussed above in reference to the preferred collector. A missed consumption packet transmitted from a telemetry device to the preferred collector does not necessarily mean the meter data included within the consumption packet is lost. Typically meter data is included in multiple transmissions from a telemetry device, and thus a small number of failed transmissions is not necessarily fatal to the integrity of the processed data generated by the preferred collector based on the meter data. For example, although a telemetry device may have only a 60% transmission success rate for transmissions between the telemetry device and the preferred collector, the preferred collector may collect enough meter data in said transmissions to transmit 96% of the processed data for a given time period to the monitoring station, thus having a 96% data collection rate.

For a given telemetry device, the monitoring station generates a request for missing data (60) and transmits the request to a designated alternate collector for the telemetry device (62). If the telemetry device has more than one designated alternate collector, the monitoring station can first transmit the request for missing data to a first alternate collector, and if the missing data is not retrieved from the first alternate collector, then transmit a second request to a second alternate collector. Alternatively, the monitoring station can send a request to each alternate collector at the same time. However, this can result in duplication of processing at the more than one alternate collectors and redundant transmission of processing data. Depending on what caused the preferred collector not to initially provide the monitoring station the missing data, the monitoring station may be successful in receiving the missing data from an alternate collector (64). For example, if the cause of the missing data is a transmission failure with the telemetry device, then neither the preferred nor the alternate collector would have received the corresponding transmission from the telemetry device. However, if the cause was due to an obstruction temporarily blocking the path of transmissions from the telemetry device to the preferred collector, but not blocking the path to an alternate collector, then the monitoring station may be successful in receiving the missing data from the alternate collector.

Referring to FIG. 10, the monitoring station can periodically re-designate the preferred and alternate collectors for a given telemetry device. The monitoring station can generate statistics about data received from the preferred and one or more alternate collectors over a specified time period (74). For example, the monitoring station can generate the data collection rate for the preferred and alternate collectors. The data collection rate can be calculated as an average for a given time period, such as a day or some increment of a day. By way of example, consider a 24-hour day divided into four 6-hour increments averaged over a three-month time period. A data collection rate can be calculated for each of the four 6-hr increments, which data collection rates could vary throughout a day. As an example, the preferred collector may have data collection rates as follows:

12:00 a.m.–6:00 a.m.: 99%;
6:00 a.m.–12:00 p.m.: 80%;
12:00 p.m.–6:00 p.m.: 77%; and
6:00 p.m.–12:00 a.m.: 96%.

Although the monitoring station has less data available from which to calculate the data collection rates for the alternate collector, since the alternate collector only provides missing data upon specific request, the data collection rates can be similarly calculated. The alternate collector may have data collection rates as follows:

12:00 a.m.–6:00 a.m.: 96%;
6:00 a.m.–12:00 p.m.: 97%;
12:00 p.m.–6:00 p.m.: 95%; and
6:00 p.m.–12:00 a.m.: 96%.

It seems apparent from reviewing the above statistics that the alternate collector has overall higher data collection rates than the preferred collector. This is an example where a re-designation of the preferred and alternate may be deemed necessary by the monitoring station. The preferred collector probably discovered the telemetry device and generated the sampling information provided to the monitoring station during the 12:00 a.m. to 6:00 a.m. time period, since that is the only time period throughout the day that the preferred collector outperforms the alternate collector, and it was upon that information the collector was originally designated as the preferred collector. During the 12-hour span of 6:00 a.m. to 6:00 p.m. the data collection rate for the preferred collector decreases significantly, which could be due, for example, to a temporary obstruction, such as a vehicle, that consistently blocks transmissions between the telemetry device and the collector during some or all of that time period.

The monitoring station analyzes the statistics generated, either comparing the performance of the collectors to one another, or comparing the performance to a set of criteria (76). Based on the analysis, the monitoring station can decide to redesignate the preferred and/or alternate collectors ('yes' branch of decision step 78). If it is determined that one or more designations should be changed based on the statistical analysis, then the monitoring station re-designates the preferred and one or more alternate collectors (80). A command is sent from the monitoring station to each collector affected by the re-designation (82) notifying the collectors of the re-designation. In reference to the above example, the monitoring station may determine that the alternate collector in fact has an overall higher data collection rate than the preferred collector and decide to switch the designations. A command would be sent from the monitoring station to each collector notifying them of their new status. If the analysis shows that a change to the designation is not necessary ('no' branch of decision step 78), then the designations are left as is and the re-designation process ends (84).

In one implementation, the monitoring station 16 can be configured to periodically generate and analyze statistics about each telemetry device to determine whether re-designation of the preferred and/or the alternate collectors for the telemetry device is necessary. The periodic re-designation process could occur on a rotating schedule so that the designations for each telemetry device are revisited every three months, for example, although not all of the telemetry devices would be re-designated at the same time, thus distributing the burden of the re-designation process on the monitoring station 16.

Referring to FIG. 11, a monitoring station can receive sampling information from a collector in reference to a known telemetry device, that is a telemetry device that is not new to the metering system and already has a designated preferred an alternate collector (86). For example, if an obstruction that blocked transmissions from the telemetry device to a collector was removed, the collector would suddenly receive a first transmission from the telemetry device, thus triggering the discovery process described above. The monitoring station can compare the sampling information received from the collector to statistical information about the designated preferred and alternate collectors, which statistical information can be generated as described above (88).

The monitoring station may manipulate the sampling information to generate a figure that is comparable to a statistic generated for the preferred and alternate collectors. For example, a transmission success rate included in sampling information, which is the rate of successful transmissions as between the telemetry device and the collector providing the sampling information, referred to hereafter as the "new collector", can be processed through a function to generate an anticipated daily data collection rate. The anticipated data collection rate for the new collector can then be compared to the data collection rates for the preferred and alternate collectors.

Based on the comparison, the monitoring station can determine whether to change the preferred and/or alternate designations (90). If the monitoring station decides to change a preferred or alternate designation ('yes' branch of decision step 90), the monitoring station can re-designate one or more of the preferred and alternate collectors (92) and send commands to the affected collectors notifying them of their changed status (94). Alternatively, if the monitoring station determines not to change the preferred and alternate designations ('no' branch of decision step 90), then a command is sent to the new collector instructing the collector to untrack the meter (96).

In one implementation, the monitoring station can be configured to periodically age untracking commands. Meaning, for example, if a collector had been instructed to untrack a telemetry device, based on sampling information transmitted from the collector to the monitoring station, then after a predetermined time period the command would expire. If the collector continued to receive transmissions from the telemetry device, then the collector would "rediscover" the telemetry device, generating new sampling information, which would be transmitted to the monitoring station. The monitoring station would use the new sampling information to determine whether to re-designate the preferred and/or alternate collectors, using techniques described above.

A number of embodiments of the invention have been described. Nevertheless, it will be understood that various modifications may be made without departing from the spirit and scope of the invention. Accordingly, other embodiments are within the scope of the following claims.

What is claimed is:

1. A data collection system, comprising:
   (a) a plurality of telemetry devices, each configured to:
       generate a series of measurements; and
       transmit the measurements;
   (b) a plurality of collection devices, each configured to:
       receive measurements from one or more telemetry devices;
       transmit data based on the measurements received from a telemetry device in a first set of telemetry devices to a monitoring station;
       upon request from the monitoring station, transmit data based on measurements received from a telemetry device in a second set of telemetry devices to the monitoring station; and (c) a monitoring station, configured to:
designate a collection device as a preferred collection device for a telemetry device and designate at least one other collection device as an alternate collection device for the telemetry device;
receive data from the preferred collection device for the telemetry device; and
based on the data received from the preferred collection device for the telemetry device, send a request to at least one alternate collection device for the telemetry device for missing data for the telemetry device.

2. The system of claim 1, wherein the plurality of collection devices transmit data directly to the monitoring station.

3. The system of claim 1, wherein the plurality of collection devices transmit data indirectly to the monitoring station via one or more intermediate devices.

4. The system of claim 1, wherein transmissions from the plurality of telemetry devices are received directly by one or more collection devices.

5. The system of claim 1, wherein transmissions from one or more of the telemetry device are received by one or more collection devices indirectly from one or more repeater devices.

6. The system of claim 1, wherein the monitoring station is configured to designate a preferred collection device and an alternate collection device for each telemetry device having transmissions received by more than one collection device.

7. The system of claim 1, wherein:
the plurality of collection devices are each further configured to generate sampling information in reference to a telemetry device and to transmit the sampling information to the monitoring station; and
the monitoring station is configured to designate a collection device as a preferred collection device and at least one collection device as an alternate collection device for the telemetry device based the sampling information received from one or more collection devices.

8. The system of claim 7, wherein the sampling information is based on data received from a telemetry device over a predefined sampling period.

9. The system of claim 8, wherein the sampling period is approximately four to twenty-four hours.

10. The system of claim 7, wherein the sampling information includes a transmission success rate.

11. The system of claim 10, wherein the sampling information further includes at least one of a determined signal strength and a signal to noise ratio.

12. The system of claim 1, wherein the monitoring station is further configured to send a first request to a first alternate collection device for missing data for a telemetry device and, based on a response to the request, send a second request to a second alternate collection device for the missing data.

13. The system of claim 1, wherein each of the plurality of telemetry devices includes:
a sensor configured to generate a series of successive measurements by measuring the parameter at a series of measurement times;
a memory configured to store a plurality of measurements from said series of successive measurements; and
a transmitter configured to transmit measurements stored in memory at a series of transmission times, each of said transmitted measurements being transmitted at a plurality of different transmission times.

14. The system of claim 13, wherein the transmitter of each telemetry device is configured to generate wireless transmissions.

15. The system of claim 13, wherein the parameter is selected from the group consisting of electrical power, fluid flow, voltage, current, temperature, pressure and humidity.

16. A data collection system, comprising:
(a) a plurality of telemetry devices, each configured to:
generate a series of measurements; and
transmit the measurements;
(b) a plurality of collection devices, each configured to:
receive measurements from one or more telemetry devices;
transmit data based on the measurements received from a telemetry device in a first set of telemetry devices to a monitoring station;
upon request from the monitoring station, transmit data based on measurements received from a telemetry device in a second set of telemetry devices to the monitoring station; and
(c) a monitoring station, configured to:
designate a collection device as a preferred collection device for a telemetry device and designate at least one other collection device as an alternate collection device for the telemetry device;
receive data from the preferred collection device for the telemetry device; and
based on the data received from the preferred collection device for the telemetry device, send a request to at least one alternate collection device for the telemetry device for missing data for the telemetry device, wherein the monitoring station is further configured to:
generate statistics in reference to a telemetry device based on data received from the preferred collection device and the at least one alternate collection device designated for the telemetry device; and
determine whether to re-designate one or more of the preferred collection device and the at least one alternate collection device for the telemetry device based on the statistics.

17. The system of claim 16, wherein the statistics include:
a data collection success rate for each of the preferred collection device and the at least one alternate collection device.

18. The system of claim 16, wherein the monitoring station is configured to generate the statistics periodically.

19. A data collection system, comprising:
(a) a plurality of telemetry devices, each configured to:
generate a series of measurements; and
transmit the measurements;
(b) a plurality of collection devices, each configured to:
receive measurements from one or more telemetry devices;
transmit data based on the measurements received from a telemetry device in a first set of telemetry devices to a monitoring station;
upon request from the monitoring station, transmit data based on measurements received from a telemetry device in a second set of telemetry devices to the monitoring station; and
(c) a monitoring station, configured to:
designate a collection device as a preferred collection device for a telemetry device and designate at least one other collection device as an alternate collection device for the telemetry device;

receive data from the preferred collection device for the telemetry device; and based on the data received from the preferred collection device for the telemetry device, send a request to at least one alternate collection device for the telemetry device for missing data for the telemetry device, wherein the monitoring station is further configured to:

receive sampling information from one or more collection devices for a known telemetry device having a designated preferred collection device and at least one alternate collection device, wherein the one or more collection devices are not the designated preferred or alternate collection devices;

generate statistics for the known telemetry device based on data received from the preferred collection device and the at least one alternate collection device; and determine whether to re-designate the preferred collection device and the at least one alternate collection device for the known telemetry device based on the statistics and the sampling information.

20. The system of claim 19, wherein:

the sampling information includes a transmission success rate for the one or more collection devices; and the statistics include a data collection success rate for each of the preferred collection device and the at least one alternate collection device.

21. The system of claim 20, wherein:

the transmission success rate included in the sampling information is converted into an anticipated data collection rate for the one or more collection devices;

the monitoring station is configured to determine whether to re-designate the preferred collection device and the at least one alternate collection device for the known telemetry device by comparing the anticipated data collection rate for the one or more collection devices and the transmission success rates for the preferred collection device and at least one alternate collection devices.

22. A data collection system, comprising:

(a) a plurality of telemetry devices, each configured to:
generate a series of measurements; and
transmit the measurements;

(b) a plurality of collection devices, each configured to:
receive measurements from one or more telemetry devices;
transmit data based on the measurements received from a telemetry device in a first set of telemetry devices to a monitoring station;
upon request from the monitoring station, transmit data based on measurements received from a telemetry device in a second set of telemetry devices to the monitoring station;
wherein each of the plurality of collection devices include:
a receiver configured to receive transmissions from one or more telemetry devices, the transmissions including a series of successive measurements;
a processor configured to extract the series of successive measurements from a series of received transmissions and further configured to generate processed data for the parameter by analyzing the series of successive measurements;
a transceiver configured to transmit data comprising the processed data to a monitoring station and to receive a transmission from a monitoring station (c) a monitoring station, configured to:
designate a collection device as a preferred collection device for a telemetry device and designate at least one other collection device as an alternate collection device for the telemetry device;
receive data from the preferred collection device for the telemetry device; and
based on the data received from the preferred collection device for the telemetry device, send a request to at least one alternate collection device for the telemetry device for missing data for the telemetry device.

23. The system of claim 22, wherein the transmitter of each collection device is configured to generate wireless transmissions.

24. A monitoring station, comprising:

(a) at least one receiver for receiving transmissions from a plurality of collection devices, the transmissions including sampling data and processed metered function data in reference to a plurality of telemetry devices;

(b) at least one processor programmed to:
analyze sampling data in reference to a telemetry device to designate a collection device as a preferred collection device for the telemetry device and to designate at least one other collection device as an alternate collection device for the telemetry device; and
generate a request for missing data in reference to a telemetry device based on metered function data received from the preferred collection device for the telemetry device;

(c) at least one transmitter to transmit a request for missing data to the at least one alternate collection device.

25. The monitoring station of claim 24, wherein the processor is further programmed to:

generate statistical information for a telemetry device based on the metered function data received in reference to the telemetry device from the designated preferred and at least one alternate collection device; and determine whether to re-designate a preferred collection device and the at least one alternate collection device based on the statistical information.

26. The monitoring station of claim 24, wherein the monitoring station includes a plurality of receivers, a plurality of processors and a plurality of transmitters.

27. A method of collecting data, comprising:

generating a series of measurements at a plurality of telemetry devices by measuring a parameter and transmitting the measurements;

collecting the measurements at a plurality of collection devices and processing the measurements at the collection devices to generate metered function information of the parameter;

designating a collection device as a preferred collection device and at least one other collection device as an alternate collection device for each of the plurality of telemetry devices;

receiving metered function information from the preferred collection devices at a monitoring station; and generating a request for any missing data based on the metered function information received from the preferred collection devices and transmitting the request to at least one alternate collection device.

28. The method of claim 27, further comprising:

transmitting sampling information in reference to a telemetry device from one or more collection devices to the monitoring station; and using the sampling information to designate a preferred collection device and at least one alternate collection device for a telemetry device.

29. The method of claim 27, further comprising:

generating statistical information in reference to a telemetry device based on the data received from a designated preferred collection device and at least one designated alternate collection device for the telemetry device; and determining whether to re-designate one or more of the preferred collection device and the at least one alternate collection device for the telemetry device based on the statistical information.

30. The method of claim 27, further comprising:

transmitting sampling information in reference to a telemetry device having a designated preferred and at least one alternate collection device from one or more collection devices to the monitoring station, wherein the one or more collection devices are not the designated preferred or alternate collection devices;

generating statistical information in reference to the telemetry device based on the data received from the preferred collection device and the at least one designated alternate collection device for the telemetry device; and determining whether to re-designate the preferred collection device and the at least one alternate collection device for the telemetry device based on the sampling information and the statistical information.

* * * * *